United States Patent
Yamashita et al.

(10) Patent No.: US 10,875,186 B2
(45) Date of Patent: Dec. 29, 2020

(54) ROBOT SYSTEM

(71) Applicant: FUJI CORPORATION, Chiryu (JP)

(72) Inventors: Yasuhiro Yamashita, Toyoake (JP); Nobuo Oishi, Kosai (JP); Takayoshi Sakai, Toyokawa (JP)

(73) Assignee: FUJI CORPORATION, Chiryu (JP)

( * ) Notice: Subject to any disclaimer, the term of this patent is extended or adjusted under 35 U.S.C. 154(b) by 357 days.

(21) Appl. No.: 15/755,161

(22) PCT Filed: Sep. 3, 2015

(86) PCT No.: PCT/JP2015/075044
§ 371 (c)(1),
(2) Date: Feb. 26, 2018

(87) PCT Pub. No.: WO2017/037908
PCT Pub. Date: Mar. 9, 2017

(65) Prior Publication Data
US 2018/0243913 A1   Aug. 30, 2018

(51) Int. Cl.
*G05B 15/00* (2006.01)
*G05B 19/00* (2006.01)
(Continued)

(52) U.S. Cl.
CPC ............ *B25J 9/1697* (2013.01); *B25J 13/08* (2013.01); *B25J 19/023* (2013.01);
(Continued)

(58) Field of Classification Search
CPC ........ B25J 9/1697; B25J 19/023; B25J 13/08; H04N 5/23212; Y10S 901/47; Y10S 901/09
See application file for complete search history.

(56) References Cited

U.S. PATENT DOCUMENTS 7,583,835 B2 *   9/2009   Leroux .................. B25J 9/1697
                                                    382/153
2005/0065653 A1   3/2005   Ban et al.
2005/0259175 A1 * 11/2005  Hoshuyama ....... H04N 5/23212
                                                    348/345

FOREIGN PATENT DOCUMENTS

JP    10-31151 A     2/1998
JP    2003-211382 A  7/2003
(Continued)

OTHER PUBLICATIONS

Kielhöfer, S. et al., "DLR VR-Scan: A Versatile and Robust Miniaturized Laser Scanner for short range 3D-Modeling and Exploration in Robotics", IEEE/RSJ International Conference on Intelligent Robots and Systems, XP032201124A, Sep. 25-30, 2011, pp. 1933-1939.

(Continued)

*Primary Examiner* — Harry Y Oh
(74) *Attorney, Agent, or Firm* — Oblon, McClelland, Maier & Neustadt, L.L.P.

(57) ABSTRACT

A robot system for performing drive control of a robot arm with respect to a target object according to information obtained by a camera, including a robot having a working section, a camera mounted in the vicinity of the working section, and a control device for controlling the driving of the robot while confirming the target object based on image data of the camera, is provided. The control device performs image-capture control, which executes image-capturing of the target object with the camera a plurality of times when moving the working section with respect to the target object according to a predetermined trajectory, and focus control, in which predetermined images within a plurality of images captured by image-capture control are in focus.

3 Claims, 5 Drawing Sheets

(51) Int. Cl.
*B25J 9/16* (2006.01)
*B25J 13/08* (2006.01)
*B25J 19/02* (2006.01)
*H04N 5/232* (2006.01)

(52) U.S. Cl.
CPC ........ *H04N 5/23212* (2013.01); *Y10S 901/09* (2013.01); *Y10S 901/47* (2013.01)

(56) References Cited

FOREIGN PATENT DOCUMENTS

| | | |
|---|---|---|
| JP | 2005-74600 A | 3/2005 |
| JP | 2011-255473 A | 12/2011 |
| JP | 2015-454 A | 1/2015 |
| WO | WO-2015014481 A1 * | 2/2015 ......... A61B 1/00188 |

OTHER PUBLICATIONS

International Search Report dated Oct. 13, 2015 in PCT/JP2015/075044 filed Sep. 3, 2015.

* cited by examiner

| Image-capture count | def | 1 | 2 | 3 | 4 | 5 | 6 | 7 | 8 | 9 |
|---|---|---|---|---|---|---|---|---|---|---|
| Focus position | 100 | 60 | — | — | — | 10 | — | — | — | — |

ROBOT SYSTEM

TECHNICAL FIELD

The present disclosure relates to a robot system that performs drive control of a robot with respect to a target object while referring to image data captured by a mounted camera.

BACKGROUND ART

In a robot arm or the like that handles a component by an end effector, drive control for moving the end effector to an appropriate position is performed when carrying out a fixed task. In the robot arm of Patent Document 1 described below, image information captured by a camera at a tip portion is imported into a computer and, by designating a target object that is shown on a screen of a monitor, a drive of the robot arm is controlled so that the relationship between a target object and an end effector attains a predetermined state. Specifically, obtained pixel information is converted into positional information in units of meters with calibration data of the camera prepared beforehand, and sent to a drive control device to be converted into drive control information for the robot arm.

PRIOR ART REFERENCES

PTL 1: JP-A-2005-074600
PTL 2: JP-A-10-031151

BRIEF SUMMARY

In the existing robot arm of the above example, drive processing and processing of image data captured by the camera are performed in stages. For this reason, it is not suitable to control the movement position of the end effector according to image data while the robot arm is being driven. In particular, although the focus of a camera must be adjusted in order to capture an object, automatic focus control can not follow the relative change with the target object when the movement speed is high. In this regard, in PTL 2 above, information of the aperture degree with respect to the lens position and the depth of field is recorded in a look-up table for each target object to be captured of the image, and automatic focus control is performed based on the look-up table. However, the technique described in the document is not suitable for driving a robot arm or the like in which the distance between the target object and the camera changes by a large amount.

It is an object of the present disclosure to provide a robot system which performs drive control of a robot with respect to a target object while referring to image data of a camera.

A robot system according to one aspect of the present disclosure is a robot system having: a robot having a working section for performing an operation on a target object; a camera provided to the robot in a vicinity of the working section, and a control device that performs drive control of the robot while confirming the target object based on image data from the camera, wherein the control device performs image-capture control and focus control, when moving the working section with respect to the target object according to a predetermined trajectory, the image-capture control executing image-capturing of the target object with the camera a plurality of times, the focus control focusing to predetermined images within a plurality of images captured by image-capture control.

According to the present disclosure, in a case where an operation such as gripping and moving an object is performed by a robot, drive control of the robot is performed while referring to the image data obtained by image-capturing being repeated by the camera, so that the working section can be moved in accordance with a predetermined trajectory with respect to the target object. In this case, since the lens is focused to predetermined images that are captured among a plurality of captured images, even if focusing is not performed for all of the images, the working section is moved through appropriate positions without deviating from the determined trajectory.

DETAILED DESCRIPTION

Figure 1:
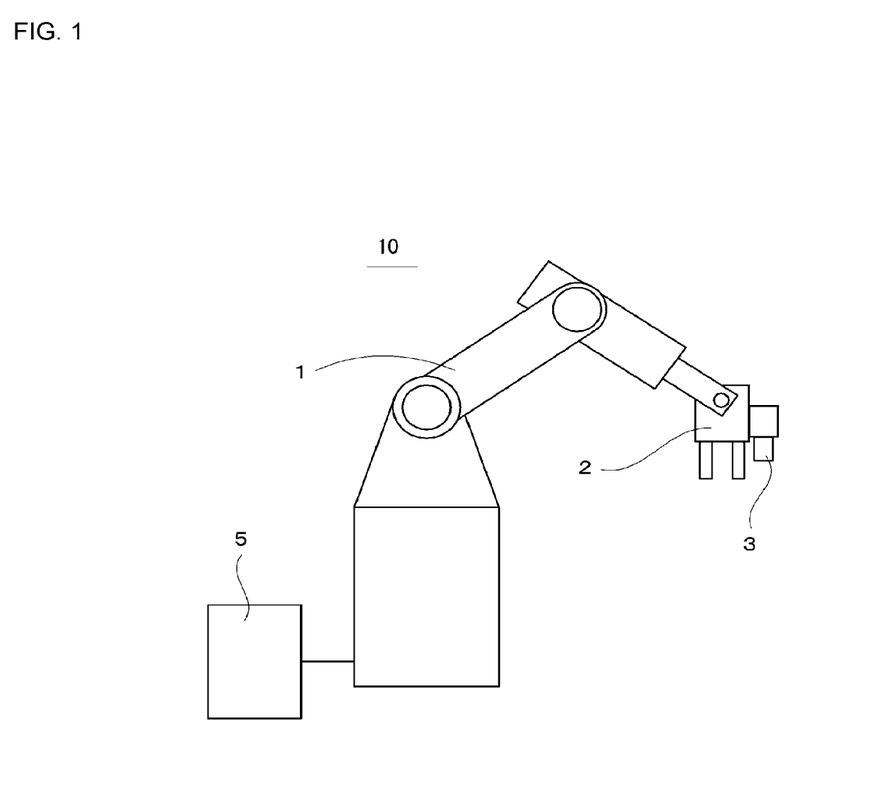
FIG. 1 is a diagram conceptually showing an embodiment of a robot system.

Next, an embodiment of a robot system according to the present disclosure will be described with reference to the drawings. A robot system of the present embodiment is, for example, a robot arm used in an electronic component mounting machine which takes out an electronic component sent out from a component supply device and mounts the electronic component to a predetermined portion of a circuit board. FIG. 1 is a diagram conceptually showing such a robot system. This robot system 10 has a multi-jointed robot arm 1. An end effector 2 is a working section provided at a tip portion of the arm so as to pinch and hold electronic components.

The robot arm 1 is configured to have a rotary table, a plurality of joint mechanisms and the like, and a servomotor, an actuator for rotationally driving a joint shaft, and the like are incorporated. The end effector 2 moves in three-dimensional space by drive control of the servomotor and each actuator. The end effector 2 has a chuck mechanism or the like for gripping electronic components. Further, a camera 3 is attached to the robot arm 1 at a tip portion of the arm where the end effector 2 is positioned. The camera 3 is for supporting operations of the end effector 2 for obtaining relative positional information of the end effector 2 and a target object such as an electronic component. A CCD image sensor, a CMOS image sensor, or the like is used as the camera 3, which is provided in the vicinity of the end effector 2.

Figure 2:
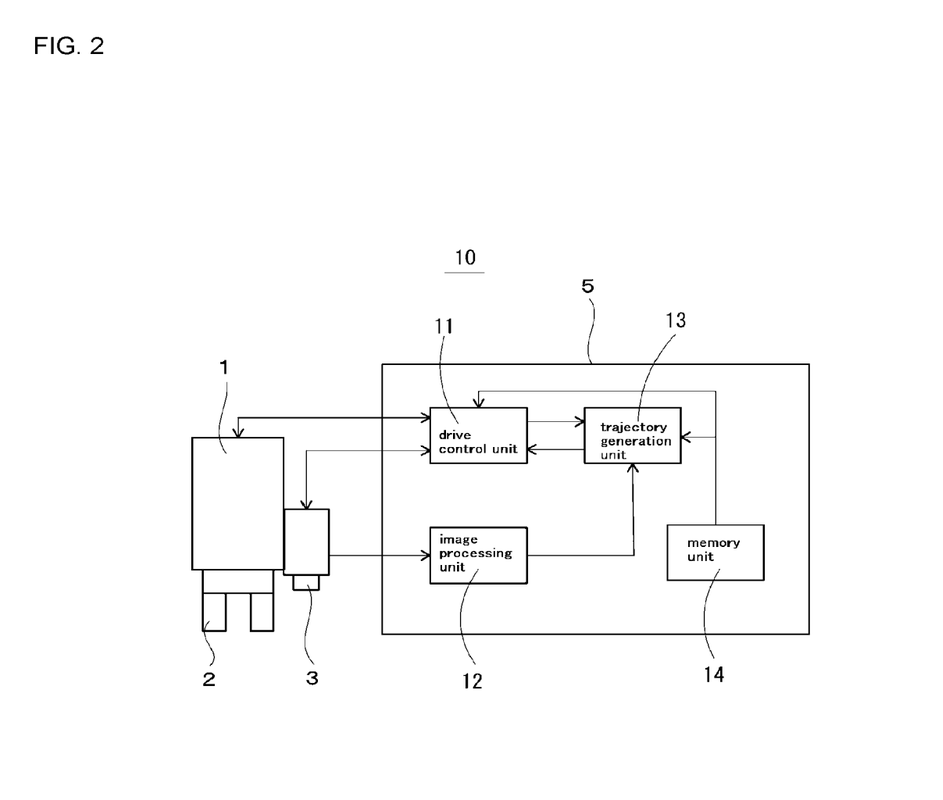
FIG. 2 is a block diagram illustrating an embodiment of a robot system.

The robot system 10 is provided with a control device 5 for performing drive control of the robot arm 1 and the end effector 2, and image-capture control of the camera 3. FIG. 2 is a block diagram showing the robot system 10 of the present embodiment. A control device 5 is connected to the robot arm 1, which includes the end effector 2, and to the camera 3. The control device 5 is has a microprocessor and a main memory, by which drive control unit 11, an image processing unit 12, a trajectory generation unit 13, and a storage unit 14 are configured.

In the electronic component mounting machine in which the robot system. 10 of the present embodiment is incorporated, electronic components gripped by the robot arm 1, as described above, are mounted to predetermined places of a circuit board. In so doing, each operating task in executing board production is determined in advance, and the movement of the robot arm 1, that is, the movement position of the end effector 2 is also predetermined. Therefore, in the storage unit 14 of the control device 5, a component mounting program that makes the robot arm 1 and the end effector 2 perform predetermined operations is stored.

The robot arm 1, whose drive is controlled by the component mounting program, moves the end effector 2 according to a predetermined trajectory, however, a subtle error due to various factors may occur in the relationship with the target object. For example, the position of the component supplied from the component supply device or the mounting position with respect to the circuit board are not necessarily always fixed. Therefore, the positional displacements may occur. Further, the robot arm 1 itself may slightly deviate from the predetermined trajectory by the movement position of the end effector 2 due to structural factors.

Then, in the control device 5, a configuration that supports movement of the end effector 2 is adopted so that the end effector 2 grips electronic components or mounts the electronic components to the circuit board in accurate manners. In other words, in the present embodiment, drive control of the robot arm 1 is performed while performing a correction process on errors, occurring in the movement of the end effector 2, based on image data obtained by the camera 3. Consequently, in the drive control unit 11 of the control device 5, image-capture control for executing image-capturing with the camera 3 and focus control of the lens for focusing on an electronic component or the like are performed in order to execute predetermined drive control on the robot arm 1.

In addition, in the image processing unit 12 of the control device 5, the relative position of the end effector 2 with respect to the electronic component is calculated from the captured image data obtained from image-capturing by the camera 3. Also, in the image processing unit 12, for example, the edge position of the electronic component is obtained from the captured image data, and the arrangement direction (orientation) and the center position of the electronic component are obtained. Further, so-called spatial data of the relative positions between the center position and the reference point of the end effector 2 is generated. The trajectory generation unit 13 generates a trajectory for moving the end effector 2 to a target position such as an electronic component. Further, various kinds of data and programs are stored in the storage unit 14; for example, trajectory information for moving the end effector 2 when taking out and mounting electronic components during the manufacturing of a circuit board, and a drive control program or the like for driving the robot arm 1 are stored.

Then, in the operation of the robot arm 1, trajectory information is transmitted from the trajectory generation unit 13 to the drive control unit 11, and the movement of the end effector 2 is controlled along the trajectory. By driving the robot arm 1, positional data of the moving end effector 2 is transmitted from the drive control unit 11 to the trajectory generation unit 13. On the other hand, as the end effector 2 moves, a target object, such as a mounting position of an electronic component or a circuit board, is captured by the camera 3, and the captured data is transmitted to the image processing unit 12. In the image processing unit 12, spatial data is generated from the captured image data, and errors for the determined trajectory stored in the memory unit 14 are calculated. The errors are then corrected by a correction process, and newly generated corrected trajectory information is transmitted to the drive control unit 11. In the drive control unit 11, drive control of the robot arm 1 based on the corrected trajectory information is resumed.

Figure 3:
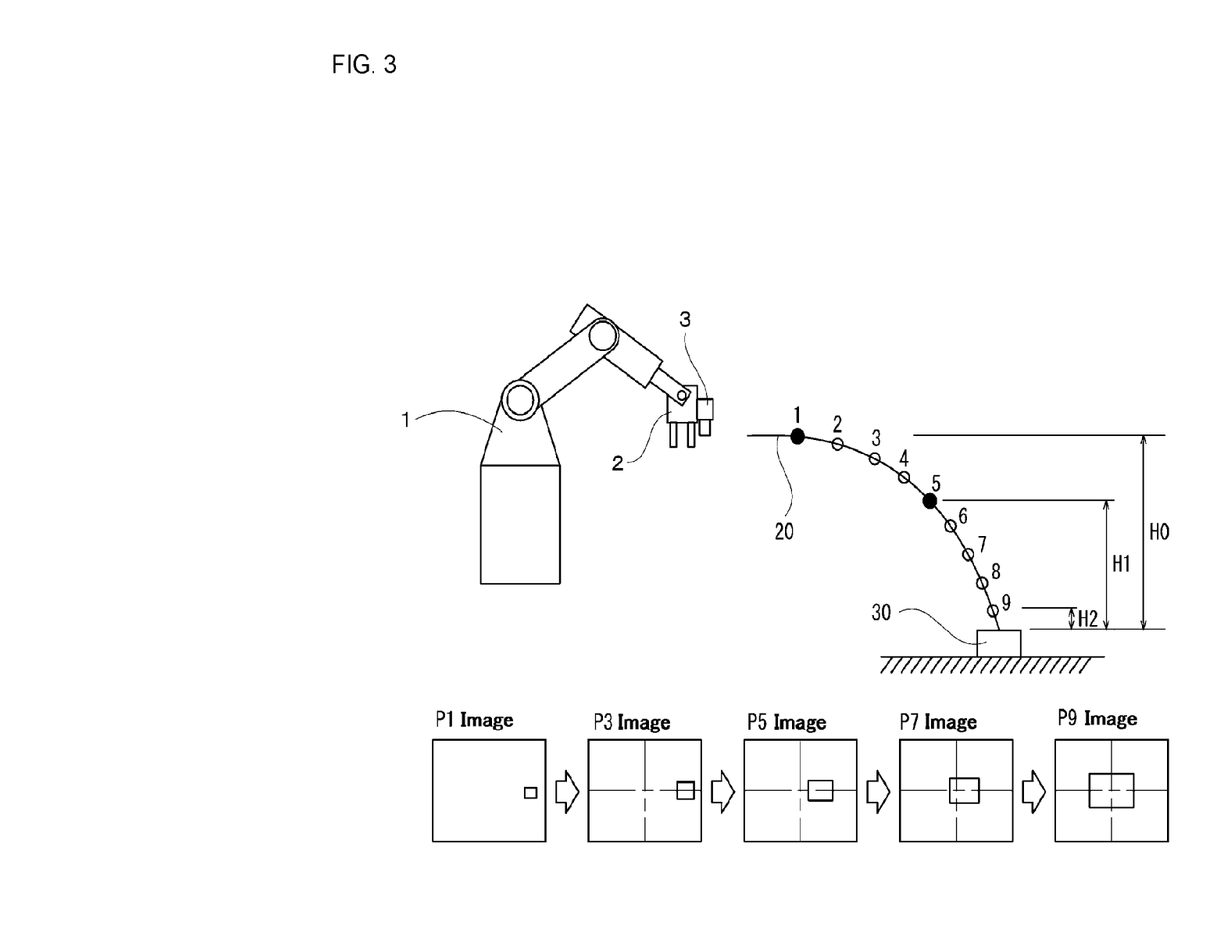
FIG. 3 is an image diagram of image-capture control by a camera and illustrates a trajectory and an image-capture screen in a case in which a robot grasps an electronic component.

As described above, the target object is captured by the camera 3 in order to generate trajectory information, and the captured image data is transmitted to the image processing unit 12. Here, FIG. 3 is an image diagram of image-capture control by the camera 3 and shows the trajectory and an image-capture screen when grasping the electronic component 30. The robot arm 1 is subjected to drive control for moving the end effector 2 along the trajectory 20 to the position of the electronic component 30. The camera 3 captures the target object from the first point to the ninth point in the movement process. The first to the ninth points are positions obtained from setting the image-capture interval to 10 ms. On the other hand, the performance of the camera 3 to be used is one in which the time required for focusing the lens is 30 ms.

In general, although it is necessary to set the image-capture interval to about 1 ms to 10 ms for correcting a trajectory of a robot with a high driving speed, a mounted camera with a focusing time of about several tens of ms can be used. Therefore, the image-capture interval becomes shorter than the focusing time, hence the focus control for focusing the lens lags behind the image-capture timing. In this case, a correction process for correcting the trajectory of the robot arm 1 is performed based on captured image data in states in which the optimal focusing is not always performed. The robot system 10 according to the present embodiment makes it possible to perform a suitable trajectory correction even when the image-capture interval is shorter than the focusing time.

First, as shown in FIG. 3, image-capturing of the electronic component 30 by the camera 3 is performed from the first point to the ninth point on the trajectory 20. As described above, image-capturing by the camera 3 is repeated at intervals of 10 ms from the start of movement of the end effector 2. However, in the present embodiment, focus control for the camera 3 is not performed at every point; instead, focus control for focusing the lens is directed only at specific points.

Figure 4:
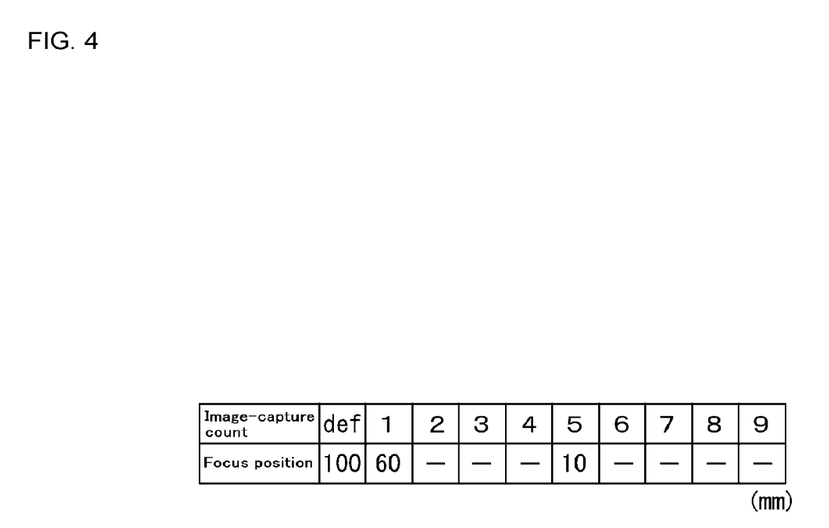
FIG. 4 is a diagram illustrating a focus control table used in focus control of the camera.

FIG. 4 is a diagram showing a focus control table used for focus control of the camera 3. The focus control table shows the number of images captured at each point from the first to the ninth point of the upper row. That is, since each image is captured once at each point, the numerical values in the upper row indicate the position of the point and the number of image captures since the start of movement. On the other hand, the lower row indicates the focus position at which focusing of the lens is performed by the focus control. In particular, since the focus control focuses the lens with reference to the height H from the electronic component 30, the numerical value in the lower row is a numerical value indicating the height from the electronic component 30.

In the focus control table of FIG. 4, the focus position (focus height) is set to 100 mm in advance. This is because the first image-capture position is 100 mm from the electronic component 30. Then, the value of "60" is indicated corresponding to the first point, that is, the first image capture "1" in the upper row. This means that the end of the first image capture coincides with performing focus control on the lens of the camera so that the focus position is at a height of 60 mm. Even if the focus control of the camera 3 is performed by a focus control instruction of the drive control unit 11, a focusing time of 30 ms is required until the lenses are focused as described above. Therefore, in the present embodiment in which image capturing is repeated at intervals of 10 ms, focusing is completed at the time of the fourth image capture after the image capture after the focus control instruction.

Then, the focus control is performed such that the lens is focused to an image several times (several points) ahead at a movement position ahead in the movement direction toward the electronic component 30 to which the camera 3 that started the focusing is moved, that is, at the height where the camera 3 passes after capturing several images. In the present embodiment, such a focus control is referred to as "advanced focusing". This advanced focusing is performed after the image is captured at the height at which the lens is focused. Therefore, the image-capture control and the focus control (advanced focusing) for the camera 3 performed by the drive control unit 11 are configured to be synchronized. In the present embodiment, the image-capture control and the focus control are performed in synchronization with each other at the first and fifth image captures of image-capturing that is performed nine times.

As shown in FIG. 4, in the present embodiment, advanced focusing is performed at the first and fifth times of image-capturing that is performed totally nine times. First, the advanced focusing performed simultaneously with the first image capture becomes the focus control predetermined in accordance with the position at which the camera 3 is moving (i.e., the fifth point shown in FIG. 3) at the time of the fifth image capture, after capturing four images. Therefore, the advanced focusing becomes the focus control aiming for the height H1, which is 60 mm from the electronic component 30. Similarly, the position at which the camera 3 is moving (i.e., the ninth point shown in FIG. 3) at the time of the ninth image capture, which capturing four images additionally, becomes the height H2, which is 10 mm from the electronic component 30. Therefore, the advanced focusing performed simultaneously with the fifth image capture becomes the focus control aiming for the height H2.

In advanced focusing, although focusing is performed a few image captures ahead, it does not mean that the images captured during that time period are not focused. This is because a fixed allowance for the range of focusing points is accepted in accordance with the depth of field of the lens of the camera 3. In the second to fourth times of image capturing, shown in FIG. 4, or the sixth to the eighth times of image capturing, the lenses of the camera 3 are being focused toward the heights H1 and H2, respectively. At these times, the camera 3 itself is also moving towards the same height, so even if the electronic component 30 as the target object is not at the center of the focal range, the electronic component 30 falls within the range of the depth of field. Therefore, even when an image is captured of a point which is not a target of advanced focusing, captured image data with sufficiently clear images is obtained.

Figure 5:
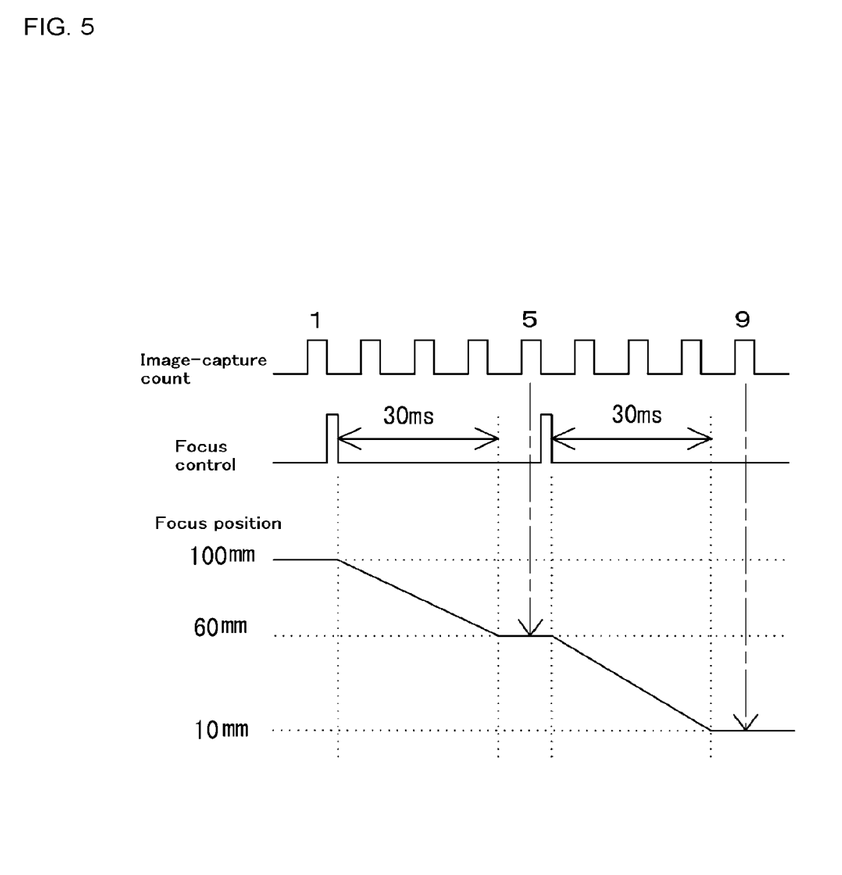
FIG. 5 is a diagram showing the relationship of image-capture control, focus control, and focus position of the robot system.

FIG. 5 is a diagram showing the relationship between the image-capture control, the focus control and the focus position of the robot system 10, and shows the same control pattern as in FIG. 3 and FIG. 4. Therefore, in the robot system 10 in the present example, the movement of the end effector 2 is controlled in the following manner: First, the camera 3 is focused at a height of 100 mm in advance. The end effector 2 then moves along the trajectory 20, and the first image capture by the camera 3 is performed at the first point at a height H0 of 100 mm from the electronic component 30. At this time, an image-capture command signal (trigger signal) is inputted from the drive control unit 11 of the control device 5 to the camera 3, the shutter is released at the camera 3, and an image of the electronic component 30 is captured. Then, a point 1 image shown in FIG. 3 is obtained.

Then, in accordance with the focus control table shown in FIG. 4, a focus control instruction signal is inputted from the drive control unit 11 to the camera 3 in synchronization with the first image-capture command signal. In the camera 3, drive adjustment is performed so that the lens is focused at a height of 60 mm from the object according to the focus control command signal inputted after the first image capture. At this time, the robot arm 1 is driven and the movement of the end effector 2 and the camera 3 continues, and the second, third, and fourth images are captured according to the trigger signal inputted to the camera 3 from the drive control unit 11. In the image capture, as shown in FIG. 5, while focusing is being executed and the focus position is being changed, as described above, since the electronic component 30 falls within the range of the depth of field, the point 3 image shown in FIG. 3 is obtained (the point 2 image and the point 4 image are omitted).

Subsequently, the captured image at the fifth point, which is the fifth captured image, is performed when the moving position of the camera 3 passes through a position of 60 mm which is at a height H1 from the electronic component 30. Since the focusing point of the lens of the camera 3 is focused at the height 60 mm at that time, image-capturing is performed in a state in which the center of the focusing point is exactly focused to the electronic component 30. At this time, the point 5 image shown in FIG. 3 is obtained. Then, in accordance with the focus control table shown in FIG. 4, a focus control command signal is inputted to the camera 3 from the drive control unit 11 in synchronization with the fifth image-capture command signal, and in the camera 3, the focusing point of the lens is adjusted so as to be focused at a height of 10 mm from the electronic component 30.

The camera 3, which continues moving, captures the sixth, seventh, and eighth images in a state in which the focus position is changing as shown in FIG. 5, and the point 7 image shown in FIG. 3 is obtained (the point 6 and point 8 images are omitted). The ninth point image, which is the ninth image captured, is then taken at a position where the height H2 of the camera 3 is 10 mm from the electronic component 30, that is, immediately before the electronic component 30 is gripped. Since the focusing point of the lens has been adjusted to a height of 10 mm at that time, image-capturing is performed while the lens is focused on the electronic component 30, and the point 9 image shown in FIG. 3 is obtained.

Therefore, according to the robot system 10 of the present embodiment, even when the focusing time of the camera 3 is longer than the image-capture interval, by performing advanced focusing, the end effector 2 and the camera 3 is appropriately moved without falling out of alignment with the trajectory 20. That is, by performing advanced focusing for not all images but for several images, it is possible to obtain captured image data that is reliably focused, and measurement error in the position of the predetermined trajectory 20 and the movement position of the end effector 2 can be corrected by a correction process. Even when an image is captured of a point which is not a target of advanced focusing, captured image data with focused images can be obtained almost every time since the focusing is made according to the movement of the camera 3 and the electronic component 30 is within the range of the depth of field.

Although an embodiment of the present disclosure has been described above, the present disclosure is not limited thereto, and various modifications are possible without deviating from the spirit of the disclosure. For example, in the above embodiment, a robot system configured by a multi-jointed robot arm 1 has been described as an example, but in addition to the robot arm, a robot of a horizontal multi-jointed type or an XYZ orthogonal type may be used. The focus control table shown in FIG. 4 is merely an example and can be set in various ways depending on the performance of the camera 3, the moving distance of the end effector 2, and the like.

REFERENCE SIGNS LIST

1 . . . robot arm 2 . . . end effector 3 . . . camera 5 . . . controller 11 . . . drive control unit 12 . . . image processing unit 13 . . . trajectory generating unit 14 . . . memory unit 20 . . . trajectory 30 . . . electronic component 10

The invention claimed is:

1. A robot system comprising:
    a robot having a working section for performing an operation on a target object;
    a camera provided to the robot in a vicinity of the working section, and
    a control device that performs drive control of the robot while confirming the target object based on image data from the camera, wherein
    when moving the working section with respect to the target object according to a predetermined trajectory, the control device captures a plurality of images of the target object with the camera a plurality of times at fixed time intervals, and focuses predetermined images within the plurality of images such that a lens of the camera is focused on the target object when the camera is at specified positions along the predetermined trajectory, and
    the control device performs an advance focusing of the lens in which, at a predetermined position of the camera along the predetermined trajectory, the lens of the camera is set for a focus position along the predetermined trajectory that is different than the predetermined position of the camera along the predetermined trajectory so that when the camera is at the focus position, an image among the plurality of images is captured at which the target object is focused, the focus position being ahead of the predetermined position in a movement direction of the working section along the predetermined trajectory.

2. The robot system according to claim 1, wherein the robot has a multi jointed robot arm, a hand mechanism is provided as the working section at a tip portion of the robot arm, and the camera is provided thereto.

3. The robot system according to claim 2, wherein pivoting axes of the multi-jointed robot arm are perpendicular to a moving direction of the hand mechanism.

* * * * *